United States Patent [19]

Asrar et al.

[11] Patent Number: 5,952,406
[45] Date of Patent: Sep. 14, 1999

[54] FIRE RETARDED POLYAMIDE

[75] Inventors: Jawed Asrar, Chesterfield; Carol R. Weiss, Florissant, both of Mo.

[73] Assignee: Solutia Inc., St. Louis, Mo.

[21] Appl. No.: 08/862,995

[22] Filed: May 27, 1997

[51] Int. Cl.$^6$ .................................................. C08K 5/5313
[52] U.S. Cl. ............................................. 524/101; 524/139
[58] Field of Search .................................... 524/101, 139; 528/321

[56] References Cited

U.S. PATENT DOCUMENTS

| | | | |
|---|---|---|---|
| 3,941,752 | 3/1976 | Kleiner et al. | |
| 4,032,517 | 6/1977 | Pickett et al. | |
| 4,073,767 | 2/1978 | Birum | 260/45.8 R |
| 4,081,463 | 3/1978 | Birum et al. | |
| 4,169,935 | 10/1979 | Huheisel et al. | 524/139 |
| 4,233,434 | 11/1980 | Kraus et al. | 528/321 |
| 4,298,518 | 11/1981 | Uhmura et al. | |
| 4,317,766 | 3/1982 | Kawasaki et al. | 524/101 |
| 4,397,750 | 8/1983 | Chibnik | 252/51.5 A |
| 4,649,177 | 3/1987 | Gabbet et al. | 528/321 |
| 4,786,673 | 11/1988 | Morival et al. | 524/101 |
| 4,866,114 | 9/1989 | Taubitz et al. | 524/100 |
| 5,276,066 | 1/1994 | Paulik et al. | 524/108 |
| 5,344,931 | 9/1994 | Cipolli et al. | 524/100 |
| 5,750,603 | 5/1998 | Asrar | 524/139 |

FOREIGN PATENT DOCUMENTS

WO9700916  1/1997  WIPO.
WO9739053  10/1997  WIPO.

OTHER PUBLICATIONS

James S. Ridgway, "Polyamides from 1,4–Cyelohexanebis(Ethylamine) and Aliphatic Dicarboxylic Acids", *Journal of Applied Polymer Science*, vol. 18, pp. 1517–1528 (1974).

*Primary Examiner*—Veronica P. Hoke
*Attorney, Agent, or Firm*—Thompson Coburn LLP; Gordon F. Sieckmann

[57] ABSTRACT

A fire retarded composition of polyamide, 2 to 5 weight % melamine cyanurate and about 0.07 to about 0.5 weight % phosphorus based on weight of the composition. Phosphorus is preferably provided as a copolyamide containing polymerized carboxyphosphinic acid compound.

5 Claims, No Drawings

FIRE RETARDED POLYAMIDE

BACKGROUND OF THE INVENTION

This invention relates to polyamide compositions and more particularly to halogen-free, fire retarded (FR) polyamide compositions.

U.S. Pat. No. 4,298,518 (Ohmura et al) discloses melamine cyanurate (MC) as a non-halogen FR additive in polyamide molding compositions. The physical properties of such compositions are only borderline adequate when MC in the composition is enough to provide a UL94 VO rating in the test for adequate fire retardance. Decreasing MC improves these properties but to the detriment of fire retardance.

It would be desirable to desensitize the physical property-fire retardancy balance in polyamide compositions containing MC as FR additive.

SUMMARY OF THE INVENTION

Now improvements have been made which improve the balance of physical and FR properties of polyamide compositions.

Accordingly, a principal object of this invention is to provide improved fire retardant polyamide compositions.

Another object is to provide polyamide compositions containing MC FR additive having an improved combination of physical and FR properties.

Other objects will in part be obvious and will in part appear from the following description and claims.

These and other objects are accomplished by using phosphorus as a component in polyamide compositions to offset reducing the amount of MC present, the combination of phosphorus (P) and reduced MC providing the desired FR while improving physical properties over those using MC alone.

More particularly, a fire retarded composition is provided comprising polyamide, 2 to 5 weight % melamine cyanurate and about 0.07 to about 0.5 weight % phosphorus based on the weight of the composition.

P in the polyamide composition is preferably present as an element of a copolyamide containing copolymerized phosphorus-containing carboxyphosphinic acid compound. P provided this way is an integral part of and chemically bound into the polymer chain which therefore will not migrate to the surface of an article molded from the composition in comparison with phosphorus blended into the composition as an additive.

DETAILED DESCRIPTION OF THE INVENTION

The invention provides halogen-free, polyamide compositions fire retarded by the presence of melamine cyanurate (MC) and phosphorus. The compositions are prepared by dry blending the components and then admixing the blended compositions under melt conditions in conventional apparatus such as a Banbury mixer or compounding extruder. Using an extruder, the melt-mixed composition is typically forced through a die opening such as a stranding die at the downstream end of the extruder, passed while in the form of a continuous ribbon-like strand through a water bath to reduce the temperature of the melt and set the thermoplastic composition and then diced into pellets. The pellets are then molded by known techniques, such as injection molding, into useful articles or spun into yarn which in turn is used in fabrics for various end uses.

Phosphorus of either the additive or reactive type is provided in the composition by phosphorus per se or inorganic or organophosphorus compounds such as phospham or those disclosed in U.S. Pat. No. 5,276,066 (Paulik, F. E. and Weiss, C. R.). With the reactive type of presence, phosphorus is an element of a monomeric compound which is randomly copolymerized into and becomes an integral part of the polyamide chain. This is preferred over the additive alternative wherein chemical attachment is not usual which can possibly result in additive migration to the surface of an article formed from the composition. This migration is called "blooming" and can adversely affect the quality of the article surface. Preferred organophosphorus compounds and methods for their preparation are described in U.S. Pat. No. 3,941,752 (Kleiner et al), the disclosure of which is herein incorporated by reference. More particularly, the carboxyphosphinic acid therein disclosed has the formula

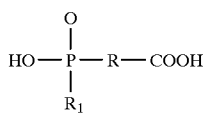

I wherein R is saturated, open chain or cyclic alkylene, arylene or aralkylene having one to 15 carbon atoms and may contain one or both of O and S, and $R_1$ is alkyl having up to 6 carbon atoms, aryl or aralkyl and may contain one or both of O and S, provided that in the R and $R_1$ groups the O, if present, is the oxygen of an ether group and the S, if present, is the sulfur of a thioether, sulfoxide, sulfone or sulfonate group. In a particularly preferred form of carboxyphosphinic acid, $R_1$ is phenyl, i.e. —$C_6H_5$ and R is ethyl, i.e. —$CH_2$—$CH_2$—. In this latter form, the compound is 2-carboxyethyl(phenyl)phosphinic acid (CEPPA). Synthesis of this species of phosphorus-containing compound is disclosed in U.S. Pat. No. 4,081,463 (Birum et al), the disclosure of which is likewise herein incorporated by reference. In this preferred composition, CEPPA is a condensation polymerized monomer in the copolyamide composition.

Polyamide of the copolyamide in this invention is the condensation product of difunctional polyamide-forming reactants—i.e. diamines and dicarboxylic acids. Preferred copolyamides are prepared from carboxyphosphinic acids, dicarboxylic acids and aliphatic amines wherein an aqueous solution of an appropriate mixture of i) diamine-dicarboxylic acid salt and ii) diamine-carboxyphosphinic acid salt is heated to melt polymerization temperature with simultaneous removal of water. Each salt is conveniently prepared by mixing substantially equimolar amounts in water of i) dicarboxylic acid and aliphatic diamine and ii) carboxyphosphinic acid and aliphatic diamine. The salts may optionally be isolated (crystallized) from their respective solutions by addition of ethanol and combined in water to provide an aqueous solution of salt or the individual salt solutions may be combined. Preferred dicarboxylic acids for making the diamine-dicarboxylic acid salt are of the formula

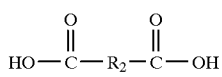

II where $R_2$ represents a hydrocarbon radical having 4 to 12 carbon atoms, for example, a polymethylene (e.g. tetramethylene or octamethylene) meta-phenylene and paraphenylene or cycloaliphatic radicals such as

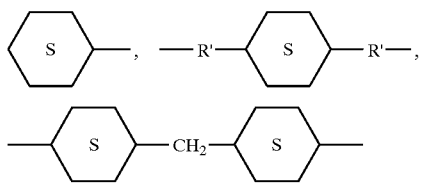

or the corresponding 1,3-radicals, where

represents a cyclohexane ring and —R'— represents —CH$_2$— or —CH$_2$CH$_2$—.

Preferred diamines for making both the diamine—carboxylic acid salt and the carboxyphosphinic acid salt are of the formula:

$$NH_2-R_3-NH_2 \qquad \qquad III$$

where R$_3$ represents a hydrocarbon radical having 4 to 12 carbons atoms, for example, polymethylene (e.g., hexamethylene), meta-phenylene, paraphenylene, or cycloaliphatic radicals such as

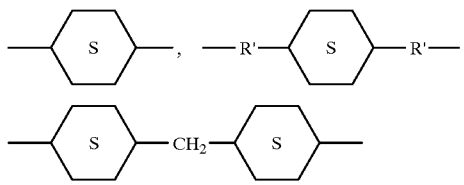

or the corresponding 1,3-radicals, where

represents a cyclohexane ring and —R'— represents —CH$_2$— or CH$_2$CH$_2$—.

In making copolyamides useful in this invention, at least one salt is formed from reactants which include a Formula I carboxyphosphinic acid and a Formula III diamine.

Salt mixtures used in preparing preferred copolyamides are hexamethylenediamine salts of adipic acid and 2-carboxyethyl(phenyl)phosphinic acid.

The proportion of carboxyphosphinic acid in the copolyamide is adjusted by mixing different percentages of the salts to be melt polymerized or different amounts of the carbophosphinic acid in the diamine salt containing that acid. The amounts of the constituents in the fire retardant compositions of the invention with P as an element of the preferred CEPPA monomer of the copolyamide are as follows:

| Copolyaide | CEPPA (wt %) IN Copolyamide | | |
|---|---|---|---|
| wt. % | 700 ppm P | 1000 ppm P | 0.5% P |
| 94 | 0.495 | 0.711 | 3.56 |
| 95 | 0.505 | 0.726 | 3.63 |
| 96 | 0.500 | 0.719 | 3.6 |
| 98 | 0.489 | 0.704 | 3.52 |

Melamine cyanurate is provided either by compounding it with the phosphorus-containing component (e.g. polyamide) or by generating MC from melamine and cyanuric acid in situ by melt mixing with the polyamide or the phosphorus-containing copolyamide. MC compound is commercially available from Chemie Linz as Melapur® ML 25. The fire-retarded composition may also be prepared by melt blending the phosphorus-containing copolyamide with melamine cyanurate-containing polyamide.

The invention is further described in the following Examples which are not intended to limit or restrict the invention. Unless otherwise indicated, all quantities and percentages are expressed in weight.

Properties recited in the Examples are measured or determined using the following procedures and tests:

1. Underwriters' Laboratory flammability test designated UL 94 is described in "Standard For Tests For Flammability of Plastic Materials For Parts In Devices And Appliances", third editions Jan. 28, 1980. Briefly, in this UL 94 vertical burn test, a test specimen measuring 5"×–0.5"×0.0625" (127×12.7×1.59 mm) is suspended vertically at a measured height above a flame from a Bunsen burner. After 10 seconds the flame is removed and the duration of flaming of the test specimen noted. Immediately the flame is placed again under the specimen and after 10 seconds the flame is again withdrawn and the duration of flaming and glowing noted. Five test specimens are thus tested and the results of all five tests are considered in the determination of a rating for the plastic material.

The following are noted: (1) duration of flaming after first flame application ; (2) duration of flaming after second flame application; (3) duration of flaming plus glowing after second flame application; (4) whether or not the specimens burn up to their point of suspension; and (5) whether or not specimens drip flaming particles which ignite a cotton swatch placed 12 inches beneath the test specimen.

The highest rating given to a material is "V-0" which indicates that (1) no specimen burns with flaming combustion for more than 10 seconds after each application of the test flame; (2) the material does not have a total flaming combustion time exceeding 50 seconds for the 10 flame applications for each set of 5 specimens; (3) no specimen burns with flaming or glowing combustion up to the holding clamp; (4) no specimen drips flaming particles that ignite the dry cotton beneath the specimen; and (5) no specimen glows for more than 30 seconds after the second removal of the flame.

The next highest rating is "V-1" which indicates that (1) no specimen burns with flaming combustion for more than 30 seconds after each application of the test flame; (2) the material does not have a flaming combustion time exceeding 250 seconds for the 10 flame applications for each set of 5 specimens; (3) no specimen burns with flaming or glowing combustion up to the holding clamp; (4) no specimen drips flaming particles that ignite the dry surgical cotton beneath the specimen; and (5) no specimen glows for more than 60 seconds after the second removal of the flame.

A "V-2" rating is given to a composition (1) when no specimen burns with flaming combustion for more than 30 seconds after each application of the test flame; (2) it does not have a total flaming combustion time exceeding 250 seconds for the 10 flame applications for each set of 5 specimens; (3) no specimen burns with flaming or glowing combustion up to the holding clamp; (4) some specimens drip flaming particles which burn only briefly, some of which ignite the dry cotton beneath the specimen; and (5) no specimen glows for more than 60 seconds after the second removal of the flame.

2. Oxygen Index—ASTM D2863. This measures the minimum level of oxygen in an oxygen/nitrogen mixture required to cause the sample to burn for no longer than 3 min. The higher the oxygen level, the less burnable the sample.

3. Time to Ignite—ASTM E1354. This simulates behavior in a fire. Gases evolved from a heated sample are caused to flame; the longer the time to create the flame, the better the ignition resistance of the sample.

4. Peak Rate of Heat Rise—ASTM E1354. This measures heat release per unit of sample surface; the lower the value the better the flame retardancy.

5. Physical Properties.

Tg—glass transition temperature by differential mechanical analysis.

Tm—melting point by differential scanning calorimeter.

HDT—heat distortion temperature at two loads—ASTM D648.

EXAMPLE 1

Preparation of copolyamide of nylon 6,6 and 2-carboxyethyl(phenyl)phosphinic acid A) Hexamethylendiamine (HMDA)-adipic acid salt. In a 250 ml flask is placed 14.60 gm (0.100 mole) adipic acid. The acid is dissolved in 110 ml ethyl alcohol by warming and then cooled to room temperature. A solution of 11.84 g (0.12 mole) hexamethylene diamine in 20 ml ethyl alcohol is added quantitatively with mixing to the adipic acid solution which causes spontaneous warming. Crystallization soon occurs. After standing overnight the salt is filtered and washed with cold alcohol and air dried to constant weight. Yield is 25.5 g (97%). 2% excess diamine is used to promote a salt rich in diamine. The white crystalline salt melts at 196–197° C. and has a pH of about 7.6 determined with a pH meter on a 1 solution of salt in water.

B) Hexamethylene diamine-2-carboxyethyl(phenyl) (CEPPA) phosphinic acid salt. 59.6 gm of CEPPA and 280 ml ethanol are added to a 1000 ml flask equipped with mechanical stirrer. The flask contents are heated to about 55° C. to dissolve the CEPPA and then the clear water white solution is cooled to 27.5° C. 170 ml of clear water white solution of 34.16 g of HMDA in water is added dropwise to the stirred CEPPA-ethanol solution over about 28.5 min. The temperature slowly increases over time to a maximum of 48° C. and then recedes to about 24° C. A thick white slurry is present in the flask after about 1 hr. 35 min. 78.6 gm of dry HMDA-CEPPA salt is recovered which melts at 220 to 226° C.

C) Nylon 6,6-CEPPA copolymer. A 75% aqueous slurry of the salts of A and B above are added to a stainless steel high pressure autoclave which had been purged of air with purified nitrogen. The slurry contains CEPPA-HMD salt as 1.34 gm CEPPA and 1.45 gm HMD and 151 gm HMDA-AA salt. The temperature and pressure are slowly raised to 220° C. and 250 psig (1700 kPa) and held there for about 30 min. Then the temperature is further increased to 243° C. while maintaining pressure at 250 psig during which time steam condensate is continuously removed. The pressure is then gradually reduced to atmospheric pressure over a 25 min. period. The reactant polymer mass is allowed to equilibrate for 30 min. at about 275 to 285° C.; the autoclave is cooled to room temperature and the stirrer replaced with a three hole spinneret. The autoclave contents are then reheated to 285° C. and the polymer melt at 150 psig nitrogen pressure is spun directly from the autoclave into fiber or filament form and then into a quench bath of water after which it is taken up on a bobbin with a Leesona winder. This fiber is then drawn to about 5 times its original length over a hot pin at 60–90° C. The polymer physical properties are shown for sample PP271 in Table 1 below. CEPPA content of the polymer is 1.08% providing a phosphorous content in the nylon 6,6-CEPPA copolymer of 1575 parts P per million parts copolymer determined by non-destructive x-ray diffraction.

EXAMPLE 2

Compositions in the Tables below are identified as follows:

Vydyne® 21—nylon 6,6 homopolymer from Monsanto Company.

PP271—copolymer of nylon 6,6 containing 1.08% CEPPA prepared as recited above in Example 1.

PP271 MC—a melt blend of 4% melamine cyanurate and 96% PP271.

MC CONTROL—melt blended Vydyne 21 and 7.5% MC. This is a control composition.

Vydyne 21 and PP271 are dried at 90° C. for 5 hours under nitrogen in a vacuum oven and cooled to room temperature. Melamine cyanurate (Melapur® MC25 from Chemie Linz) is not dried before blending.

Formulations of the above compositions (at %'s shown in the Tables) are melt mixed in a Leistritz Micro 18 twin screw extruder (L/D=30/1) at a temperature sufficient to obtain a homogeneous melt and injection molded at about 258° C. melt temperature into test samples. The molded samples are conditioned for 48 hours at 73° F., 50% R.H. and then tested using the procedures identified above.

Results are as follows:

| Composition/% | | FIRE RETARDANT PROPERTIES | | | |
|---|---|---|---|---|---|
| | | UL94 (1/32" tck) | Oxygen Index % oxygen | Time To Ignite Sec. | Peak Rate Heat Release (kw/m²) |
| Vydyne 21 | - 100 | V-2 | 23 | 135 | 604 |
| PP271 | - 100 | V-2 | 25.5 | 160 | 522 |
| PP271MC | - 96/4 | V-0 | 27.5 | 155 | 551 |
| MC Control | - 100% | V-0 | 27.0 | 145 | 718 |
| Vydyne21/ PP271/MC | - 46/50/4% | V-0 | — | — | — |

| Composition/% | | MECHANICAL PROPERTIES | | | Heat Distortion Temperature ° C. | |
|---|---|---|---|---|---|---|
| | | Tg ° C. | Tm ° C. | ΔH crystal- lization J/gm | 66 psi | 264 psi |
| Vydyne 21 | - 100 | 69.5 | 264.0 | 70.6 | 227.1 | 67.4 |
| PP271 | - 100 | 77.2 | 263.1 | 73.4 | — | — |
| PP271MC | - 96/4 | 78.3 | 261.0 | 66.5 | 218.5 | 71.1 |
| MC Control | - 100 | 47.8 | 246.5 | 56.3 | 176.4 | 55.3 |

The above data for the PP271/MC formulation of the invention which is a blend of 4% melamine cyanurate and 1512 ppm phosphorus (from CEPPA) provides a V-0 UL94 rating which duplicates that of MC Control containing 7.5% MC and no phosphorous. The mechanical properties of PP271/MC, however, are much improved over those of MC Control and approach (to a significantly greater extent than MC Control) the mechanical properties of unmodified, non-flame retarded nylon 6,6 polymer (Vydyne 21).

The preceding description is for illustration and should not be taken as limiting. Various modifications and alterations will be readily suggested to persons skilled in the art. It is intended, therefore, that the foregoing be considered exemplary only and that the scope of the invention be ascertained from the following claims.

We claim:

1. A fire retarded composition comprising polyamide, 2 to 5 weight % melamine cyanurate and a flame or fire retarding carboxyphosphinic acid compound in an amount to provide about 0.07 to about 0.5 weight % phosphorus based on the weight of the composition and having the formula:

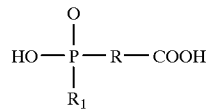

wherein R is saturated, open chain or cyclic alkylene, arylene or aralkylene having one to 15 carbon atoms and may contain one or both of O and S, and $R_1$ is alkyl having up to 6 carbon atoms, aryl or aralkyl and may contain one or both of O and S, provided that in the R and $R_1$ groups the O, if present, is the oxygen of an ether group and the S, if present, is the sulfur of a thioether, sulfoxide, sulfone or sulfonate group.

2. The composition of claim 1, wherein the polyamide is copolyamide containing polymerzied carboxyphosphinic acid.

3. The composition of claim 2 wherein the copolyamide contains the condensation polymerization product of dicarboxylic acid and diamine.

4. The composition of claim 3 wherein the dicarboxylic acid is adipic acid and the diamine is hexamethylene diamine.

5. The composition of claim 1 wherein $R_1$ is $C_6H_5$ and R is $-CH_2-CH_2-$.

* * * * *

UNITED STATES PATENT AND TRADEMARK OFFICE
CERTIFICATE OF CORRECTION

PATENT NO. : 5,952,406
DATED : September 14, 1999
INVENTOR(S) : Asrar et al.

It is certified that error appears in the above-identified patent and that said Letters Patent is hereby corrected as shown below:

Please delete the phrase in line 2 of the abstract, "0.5 weight %" and replace it with the phrase "1 weight% or preferably about 0.07 to about 0.5".

Column 3:
Lines 35-36, please delete the figures:

And replace them with the figures:

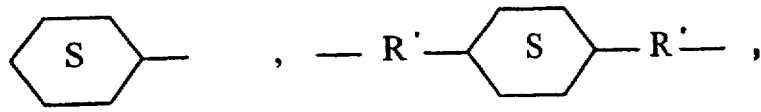

Column 4:
Line 28, please delete the term "editions" and replace it with the word, "edition".

Column 5:
Line 45, please add the symbol, "%" after the number "1".

Signed and Sealed this

Twenty-fourth Day of July, 2001

Attest:

NICHOLAS P. GODICI
Attesting Officer   Acting Director of the United States Patent and Trademark Office